United States Patent

[11] 3,633,009

[72] Inventors Thomas A. Green
 Roslyn;
 Charles W. Ross, Hatboro, both of Pa.
[21] Appl. No. 3,704
[22] Filed Jan. 19, 1970
[45] Patented Jan. 4, 1972
[73] Assignee Leeds & Northrup Company
 Philadelphia, Pa.

[54] AUTOMATIC JOINT PROBABILITY CALCULATION OF NOISE CORRUPTED PROCESS MEASUREMENTS
 9 Claims, 2 Drawing Figs.
[52] U.S. Cl. .................................................. 235/151.3,
 235/151.1, 235/151.13
[51] Int. Cl. ....................................................... G06f 15/36,
 G06f 15/46

[50] Field of Search .......................................... 235/151.1,
 151.3, 153, 193, 151.13; 318/569, 629, 636, 638;
 331/78

[56] References Cited
 UNITED STATES PATENTS
 3,419,772  12/1968  Ross ............................. 235/151.1 X Primary Examiner—Malcolm A. Morrison
Assistant Examiner—Jerry Smith
Attorneys—William G. Miller, Jr. and Raymond F. MacKay ABSTRACT: A method for automatically calculating from a noise corrupted process measurement a quantity whose value is indicative of the probability that a process disturbance has occurred which caused the measurement to vary in such a way that it does not fit the statistical model for the expected noise at a particular reference level.

INVENTORS
THOMAS A. GREEN
CHARLES W. ROSS

AUTOMATIC JOINT PROBABILITY CALCULATION OF NOISE CORRUPTED PROCESS MEASUREMENTS

BACKGROUND OF THE INVENTION

In the field of process measurement and control, the variations of the deviation of a particular measured process variable from its set point or average value often display random variations which may result from random process disturbances or from unwanted variations being introduced into the measuring system itself. Investigations have shown that such noise is correlated and that its statistical characteristic can be approximately modeled by exponentially shaped white noise with a normal magnitude distribution. In the past, attempts have been made to modify the functioning of the process control responsive to such measured variables so as to avoid taking control action in response to the noise in such measurements. One such arrangement is shown, for example, in U.S. Pat. No. 3,419,772 wherein there is utilized a filter circuit which has predetermined magnitudes to which the deviation of the measured process variable from its set point is compared. Each predetermined magnitude involves a timing device associated with it to determine when the deviation has exceeded that magnitude for an associated predetermined time duration. There is then a modification of the functioning of the process control, such as by adjusting the gain of the controller to a predetermined value when the particular predetermined magnitude has been exceeded for the associated time.

SUMMARY OF THE INVENTION

The present invention provides a method for automatically determining from a noise corrupted process measurement a quantity indicative of the probability that the measurement represents a controllable process disturbance associated with a predetermined level of deviation of the measurement from its desired value. The method comprises the steps of automatically comparing the deviation of the measurement from its desired value to the predetermined level, automatically measuring the duration of time that the deviation exceeds that predetermined level, and then automatically calculating the probability indicative quantity for that particular predetermined level as the joint function $$\gamma(\sigma_i', t_i) \text{ where } \gamma(\sigma_i', t_i) = \frac{2\sigma_i'/\sigma}{\alpha} t_i, \sigma_i'$$

being the predetermined reference level, $\sigma$ the standard deviation, $t_i$ the time during which the measurement has exceeded the corresponding reference level, and $\beta$ the average time between zero crossings for the statistical model of the noise expected in the measurement.

DESCRIPTION OF THE PREFERRED EMBODIMENT

Figure 1:
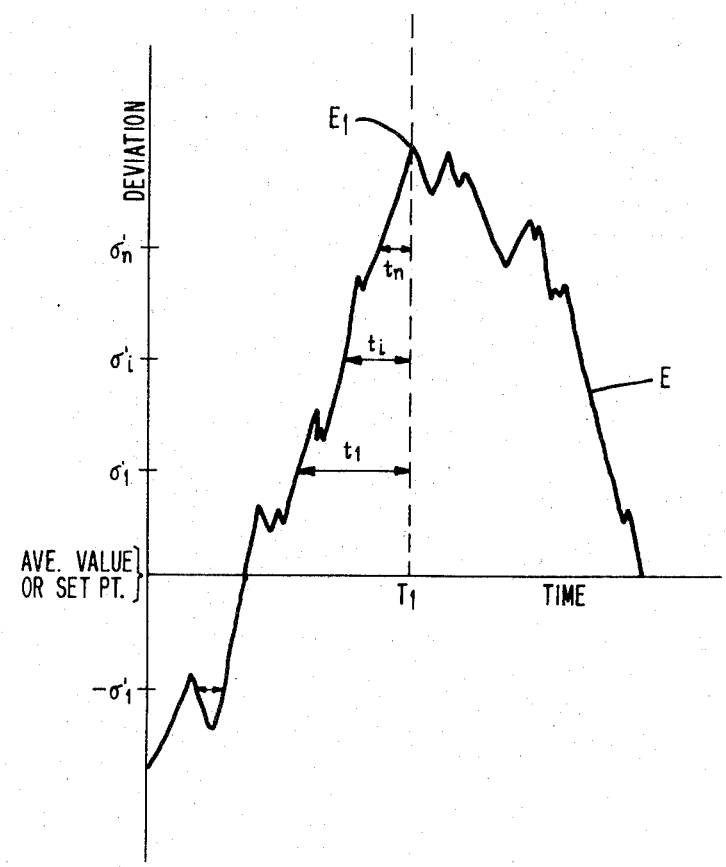
FIG. 1 is a graphical representation showing an assumed process measurement deviation from a set point.
Figure 2:
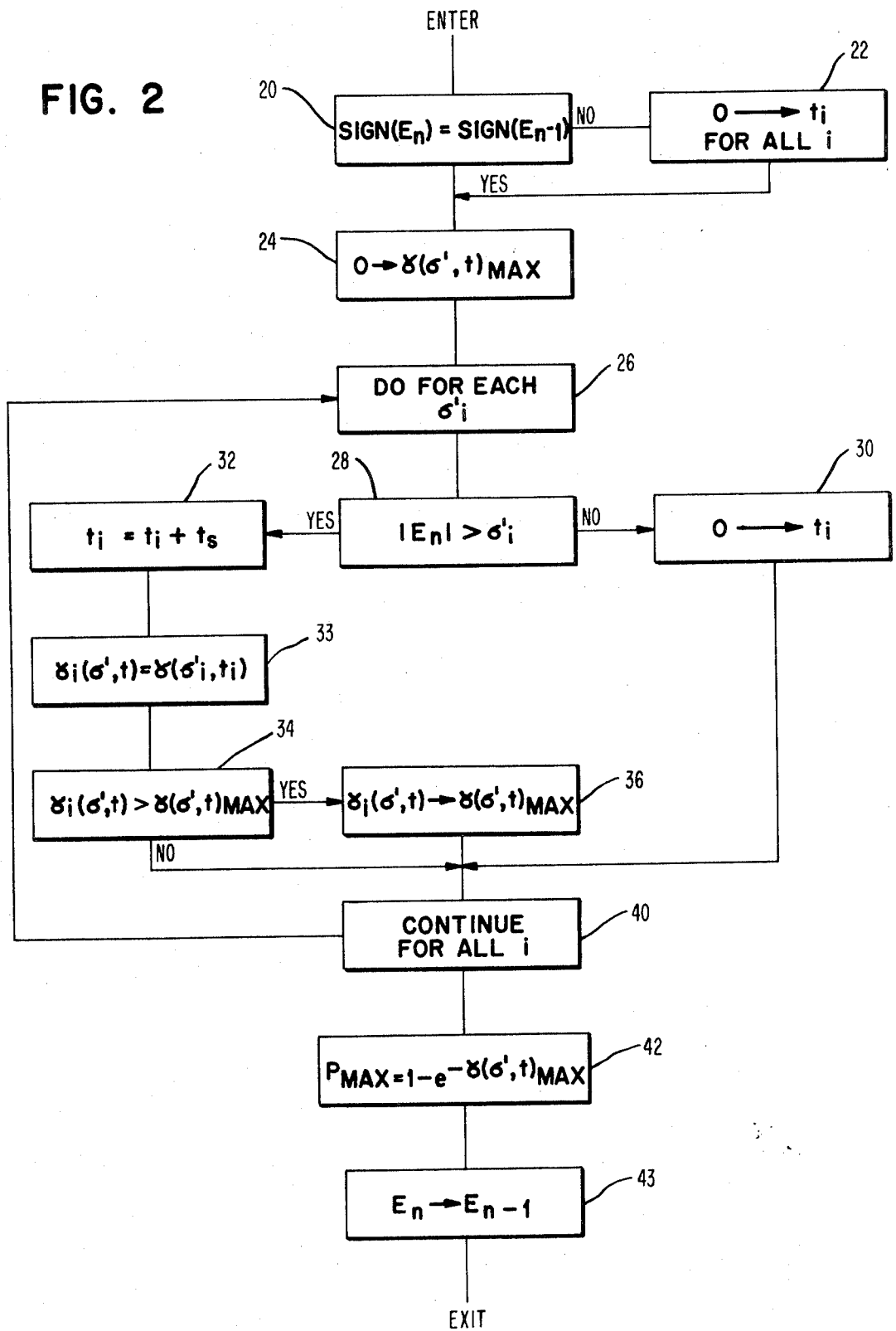
FIG. 2 is a flow diagram of one algorithm which can be utilized as a basis for programming a general purpose digital computer to carry out the novel method.

Reference should be had to FIG. 1 for an understanding of the applicability of the particular algorithm set forth in FIG. 2. In FIG. 1 there is shown, by way of example, the deviation E of a particular process variable from its set point in the form of a graphical representation with the set point being represented by the zero ordinate and with time being represented along the abscissa.

There may, for example, be established a predetermined number "$n$" of deviation levels $\sigma_i'$ distributed over the deviation span expected of the value for the particular process variable being measured. For each of the deviation levels there is determined the duration of time $t_i$ during which the deviation of the measured process variable from its set point exceeds the associated deviation level $\sigma_i'$. For example, as shown in FIG. 1, the deviation of the process variable from its set point at time $T_1$ is represented by a deviation level $E_1$.

It will be noted that the duration of time during which the measurement has exceeded the deviation level $\sigma_i'$ is the time $t_i$ whereas the deviation has exceeded the level $\sigma_n'$ for the time period $t_n$. It has been found that in order to determine the probability that the measurement of the process variable which exceeds any particular level of deviation $\sigma_i'$ from its set point at any time $t_i$ represents a process disturbance which has caused the measurement of the process variable to vary in a way which does not fit the statistical model for the expected noise can be determined by a calculation in accordance with the following joint probability distribution equation, $$P_i = 1 - e^{-\gamma(\sigma_i', t_i)}$$

where $$\gamma(\sigma_i', t_i) = \frac{2\sigma_i'/\sigma}{\alpha} t_i$$

and where $P_i$ is a measure of the probability.

$\sigma$ is the standard deviation of the statistical model of the noise as obtained from a chart record of the process variable. It may be approximated as the peak to peak value divided by 8.

$\alpha$ is the average time between zero crossings of the statistical model of the noise corrupted process measurement as obtained from the chart record, and may be averaged over 100 zero crossings for proper resolution.

The probability calculated in accordance with the above relationship can be advantageously utilized for determining whether a particular measurement is indicative of a controllable process disturbance, that is whether or not the measurement represents a process disturbance which is amenable to control under predetermined conditions. Thus, the maximum $P_i$ calculated for any particular measured process variable can be utilized as an indicator of the probability that that particular measured process variable represents a controllable process disturbance. Likewise, because of the nature of the expression for calculating the probability, it will be noted that the exponent $\gamma(\sigma_i', t_i)$ is also a maximum when $P_i$ is a maximum, hence that exponent can be used as an indicator of the probability that a particular measurement of the process variable does in fact represent a disturbance which differs from that being modeled.

In FIG. 2 there is shown in flow chart form one particular algorithm which may be used to program a digital computer in order to determine the particular joint probability distribution function set forth above which establishes the probability that a particular deviation is deterministic, or in other words, is of such nature as to represent response of the process to an upset for which control action can be usefully taken rather than response to a random and uncontrollable disturbance such as process or measurement noise.

In the algorithm of FIG. 2 upon entering the program, it is first determined, as set forth in block 20, whether or not the sign of the deviation $E_n$ during this particular sample period "$n$" is equal to, or in other words, is the same as the sign of $E_{n-1}$; that is, the sign of the deviation during the last sample period. Should those signs be different, the program then places a 0 in all the storage positions identified as $t_i$, as set forth in block 22. As set forth in block 24, a 0 is then entered into the storage position for $\gamma(\sigma', t)_{max}$ which represents the exponent that will make the calculated probability a maximum value.

After the execution of the step shown in block 24, it is then necessary to repeat a particular series of steps for each of the deviation levels $\sigma_i'$ as indicated by the statement in block 26. The first step of that repetitive program involves the comparison of the absolute value of the deviation $E_n$ to see if it is greater than the particular deviation level being examined in a particular cycle of the program, that is the deviation level $\sigma_i'$. If the absolute value of the deviation is not greater than $\sigma_i'$, as set forth in block 28, then a 0 is placed in the storage position for $t_i$ as set forth in block 30, for $E_n$ will either not have exceeded $\sigma'_i$ or $E_n$ will have returned to a value below $\sigma'_i$; whereas if the absolute value of the deviation $E_n$ is greater than $\sigma'_i$, the value of $t_i$, presently in storage, is increased by a value $t_s$, as shown in block 32, representing the time between the consecutive samples of the measured variable so as to obtain a new value for $t_i$. With the new value $t_i$, block 33 shows the calculation of the exponent $\gamma_i(\sigma', t)$ corresponding to deviation level $\sigma'_i$ and its corresponding deviation time $t_i$ using the joint function $\gamma(\sigma'_i, t_i)$ which is then compared to the current maximum exponent $\gamma(\sigma', t)_{max}$ in block 34. If the new exponent is greater than $\gamma(\sigma', t)_{max}$, it is stored in the storage position for $\gamma(\sigma', t)_{max}$ as indicated in block 36.

The program is, repeated for other values of $\sigma'_i$, as indicated by the notation in block 40 indicating that the algorithm returns to block 26 for a continuation of the several steps previously described for each of the values $\sigma'_i$. If the comparison indicated by block 34 indicates that the exponent is not greater than $\gamma(\sigma', t)_{max}$ then the program continues without changing the value stored in the storage position for $\gamma(\sigma', t)_{max}$. After this series of program steps is accomplished for each of the values $\sigma'_i$, the program then carries out the functions set forth in block 42; namely, the calculation of the joint probability function $P_{max}$ in accordance with the expression $$1 - e^{-\gamma(\sigma', t)\max}$$

Then as shown in block 43 there is a storage of the deviation value $E_n$ in the storage position for $E_{n-1}$ and the program exits, there having been determined the $P_{max}$, the $\gamma(\sigma', t)_{max}$, and all $\gamma i(\sigma', t)$ valves for the deviation $E_n$. As set forth above, the value $P_{max}$ so determined and stored in the storage location for $P_{max}$ provides an indication of the probability that the deviation $E_n$ results from a controllable process disturbance and $P_{max}$ is therefore indicative of the degree of control which should be exercised.

The probability $P_{max}$ can be utilized, for example, to determine the gain of the control being exerted on the process variable which affects the particular process measurement whose deviation is represented by E. For example, the desired gain of control system may be advantageously determined in accordance with the following equation:

$$G = K \left[ \frac{P_{max} - P_c}{1 - P_c} \right]^n$$

where
$P_c$ is the cutoff value below which $G = 0$ and the value of $K$ is the maximum gain and $n$ determines the rate at which $G$ approaches $K$.

Alternately $\gamma(\sigma', t)_{max}$ with a suitable magnitude limit could be used directly as the desired gain of a control system.

Also, the exponents $\gamma_i(\sigma', t)$ could be used to calculate the probability associated with each deviation level.

What is claimed is:

1. The method for automatically determining from a noise corrupted process measurement a quantity indicative of the probability that the measurement represents a controllable process disturbance associated with a predetermined level of deviation of the measurement from its desired value which comprises the steps of
automatically comparing the deviation of the measurement from its desired value to the predetermined level,
automatically measuring the duration of time ($t_i$) that said deviation exceeds said predetermined level, and
automatically calculating the probability indicative quantity for said predetermined level as a function of $$\gamma(\sigma_i', t_i, \text{ where } \gamma(\sigma_i', t_i) = \frac{2\sigma_i'/\sigma}{\alpha} t_i$$

$\sigma'_i$ being the predetermined level, $\sigma$ the standard deviation and $\alpha$ the average time between zero crossings for the statistical model of the noise.

2. The method of claim 1 in which the function of $\gamma(\sigma'_i, t_i)$ can be expressed as $$1 - e^{-\gamma(\sigma_i', t_i)}$$

3. The method of claim 1 in which the measurement is obtained from periodically sampled data and the steps of automatically comparing, automatically measuring and automatically calculating are carried out during each sample period.

4. The method for automatically determining from a noise corrupted process measurement a set of values for a quantity indicative of the probability that the measurement represents a controllable process disturbance associated with a corresponding set of predetermined levels of deviation of the measurement from its desired value which comprises the steps of
automatically comparing the deviation of the measurement from its desired value to each of the predetermined levels,
automatically measuring the duration of time ($t_i$) that said deviation exceeds each of said predetermined levels, and
automatically calculating the probability indicative quantity for each of said predetermined levels as a function of $\gamma(\sigma'_i, t_i)$, where $$\gamma(\sigma_i', t_i) = \frac{2\sigma_i'/\sigma}{\alpha} t_i$$

$\sigma'_i$ being that predetermined level of the set being considered, $\alpha$ being the standard deviation and $\alpha$ being the average time between zero crossings for the statistical model of the noise.

5. The method of claim 4 in which the function of $\gamma(\sigma'_i, t_i)$ can be expressed as $$1 - e^{-\gamma(\sigma_i', t_i)}$$

6. The method of claim 4 in which the measurement is periodically sampled and the steps of automatically comparing, automatically measuring and automatically calculating are carried out during each sample period.

7. The method for automatically determining from a noise corrupted process measurement a quantity indicative of the probability that the measurement represents a controllable process disturbance which comprises the steps of
automatically comparing the deviation of the measurement from its desired value to predetermined deviation levels,
automatically measuring the duration of time ($t_i$) that said deviation exceeds said predetermined levels, and
automatically calculating the probability indicative quantity for said predetermined level as the maximum value for a function of $\gamma(\sigma'_i, t_i)$, where $$\gamma(\sigma_i', t_i) = \frac{2\sigma_i'/\sigma}{\alpha} t_i$$

$\sigma'_i$ being the predetermined level, $\alpha$ the standard deviation and $\alpha$ the average time between zero crossings for the statistical model of the noise.

8. The method of claim 7 in which the function of $\gamma(\sigma'_i, t_i)$ can be expressed as $$1 - e^{-\gamma(\sigma_i', t_i)}$$

9. The method of claim 7 in which the measurement is obtained from periodically sampled data and the steps of automatically comparing, automatically measuring and automatically calculating are carried out during each sample period.

* * * * *

UNITED STATES PATENT OFFICE
CERTIFICATE OF CORRECTION

Patent No. 3,633,009                    Dated January 4, 1972

Inventor(s)   Thomas A. Green & Charles W. Ross

It is certified that error appears in the above-identified patent and that said Letters Patent are hereby corrected as shown below:

Column 1, Line 49, "$\beta$" should read --$\alpha$--.
Column 1, Line 67, after "and" insert --the various magnitudes of deviation being measured along the ordinate and--.

Column 3, Line 14, after "is" delete ","(comma) and insert --then--.
Column 3, Line 31, "valves" should read --values--.
Column 3, Line 68, "$\gamma(\sigma'_i,t_i,$" should read --$\gamma(\sigma'_i,t_i)$--.

Column 4, Line 30, "$\alpha$" should read --$\sigma$--.
Column 4, Line 55, "$\alpha$" should read --$\sigma$--.

Signed and sealed this 11th day of July 1972.

(SEAL)
Attest:

EDWARD M. FLETCHER, JR.                ROBERT GOTTSCHALK
Attesting Officer                      Commissioner of Patents